United States Patent [19]

Crisenbery et al.

[11] 4,116,318
[45] Sep. 26, 1978

[54] FLUID FLOW RESTRICTION PATH IN VISCOUS FLUID CLUTCH

[75] Inventors: Richard T. Crisenbery, Parma; Thomas H. Tinholt, Marshall, both of Mich.

[73] Assignee: Eaton Corporation, Cleveland, Ohio

[21] Appl. No.: 784,898

[22] Filed: Apr. 5, 1977

[51] Int. Cl.² .................... F16D 35/00; F16D 43/25
[52] U.S. Cl. ............................ 192/58 B; 192/82 T
[58] Field of Search ...................... 192/58 B, 82 T

[56] References Cited

U.S. PATENT DOCUMENTS

| | | | |
|---|---|---|---|
| 3,463,282 | 8/1969 | Fujita et al. | 192/58 B |
| 3,584,716 | 6/1971 | Coty | 192/58 B |
| 3,907,084 | 9/1975 | Hall | 192/58 B |
| 3,983,981 | 10/1976 | Snodgrass et al. | 192/58 B |
| 4,051,936 | 10/1977 | Crisenbery et al. | 192/82 T |

Primary Examiner—Allan D. Hermann
Attorney, Agent, or Firm—John W. Yakimow

[57] ABSTRACT

A viscous fan drive having a clutch member with a plurality of restricted fluid flow paths of a given cross sectional area communicating at one end with an element to pump fluid from the restricted flow path to a reservoir and at the other end with radially extending fluid flow paths having a greater cross sectional area than the restricted flow paths and transversing the shear area of the clutch. The restricted flow paths reduce the fluid flow outwardly of the shear area of the clutch member to reduce high speed pumpout and thus increase the speed of the fan when the drive is engaged. The flow paths have a constant cross sectional area, are circumferentially spaced about the clutch member, and transverse the lands and grooves area. The restricted flow paths have a stepped configuration radially outwardly of the flow paths to reduce fluid flow. Each restricted fluid flow path communicates with an axially extending opening transversing the clutch member radially outwardly of the stepped configuration. The openings communicate with a pumping surface on the clutch member which is closely spaced relative to the pump element.

11 Claims, 10 Drawing Figures

FLUID FLOW RESTRICTION PATH IN VISCOUS FLUID CLUTCH

Temperature responsive viscous fan drives have found wide acceptance for driving cooling fans of vehicles because they reduce fan noise and fan horsepower requirements when the fan is not needed. It is desirable in designing such drives to provide low disengaged speeds and high engaged speeds. Low disengaged speeds can be accomplished by providing clean pumpout of viscous fluid from the working chamber. In current designs of drives, radially extending grooves in the clutch having a U or V configuration have been successfully employed to provide clean pumpout. However, when such drives are applied to high rpm engines, e.g., 6000 rpm, the pumpout becomes too rapid at high speeds causing partial disengagement and, accordingly, a lower fan speed than desired at high engine rpm's.

It is, accordingly, an object of the invention to provide a temperature responsive viscous fan drive that has increased engaged fan speeds at high engine rpm's and still maintains low disengaged fan speeds.

The preceding object has been accomplished by restricting the flow of fluid through the radially extending grooves in the clutch outboard of the shear area, i.e., the interdigitated lands and grooves on the clutch and housing.

Figure 2:
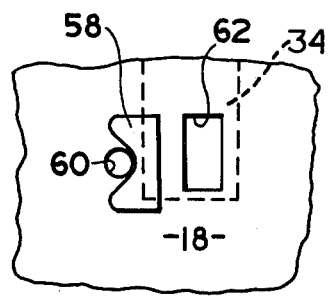
FIG. 2 is a view taken along line 2—2 of FIG. 1.
Figure 1:
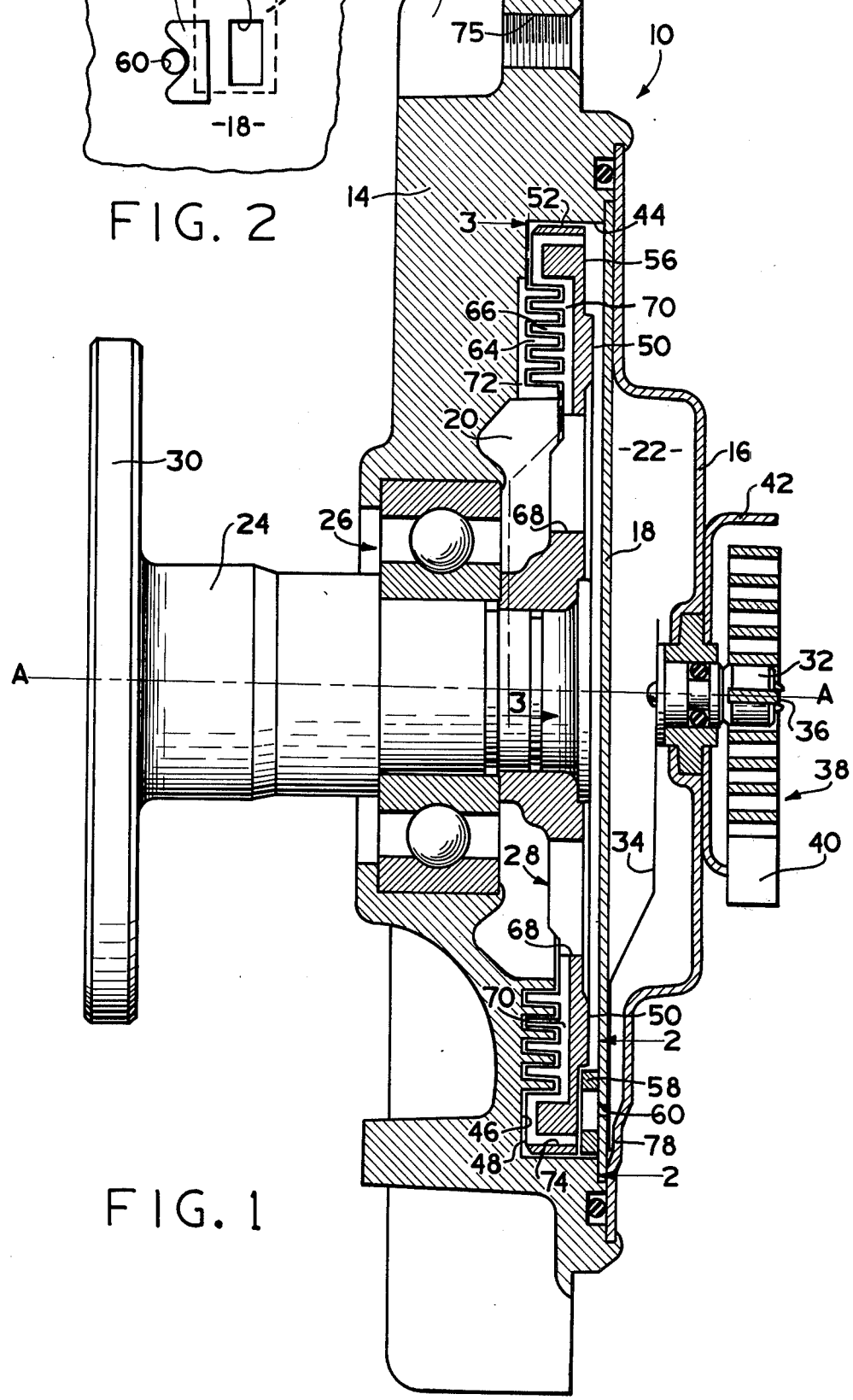
FIG. 1 is a side elevational view in section of one-half of a temperature responsive viscous fan drive according to the invention.
Figure 3:
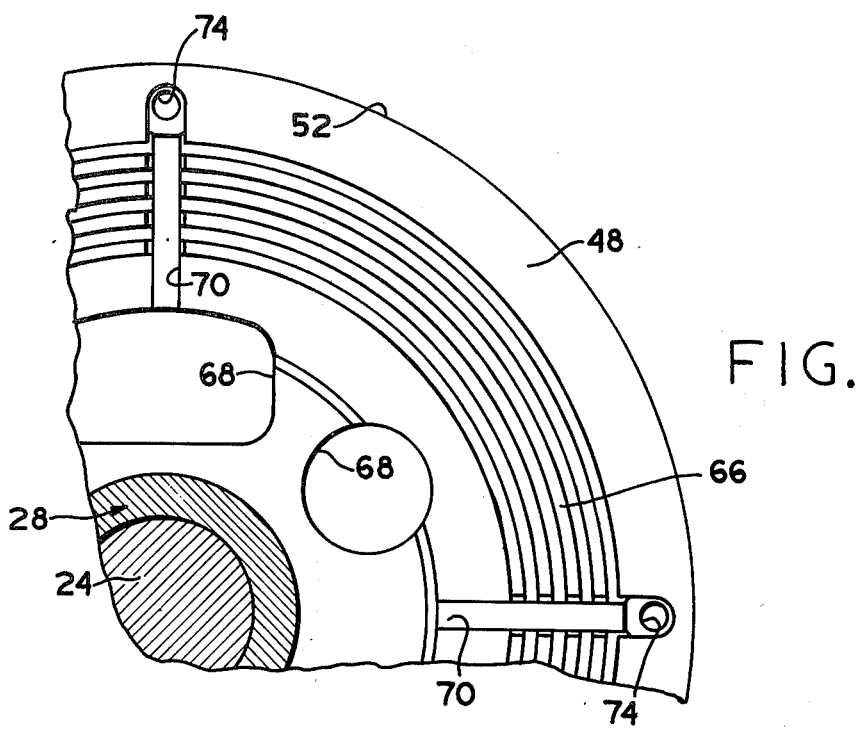
FIG. 3 is a view of a portion of the clutch taken substantially along line 3—3 of FIG. 1.

Referring to FIGS. 1 to 3, viscous fan drive 10 comprises a housing member 12 having a cast housing 14 and a cover plate 16 defining a cavity. The cavity is divided by a radially extending valve plate 18 into a working chamber 20 and a reservoir 22. An input shaft 24 is supported for rotation on housing member 12 by a ball bearing 26. An annular generally radially extending clutch member 28 is secured to one end of input shaft 24 and located within working chamber 20. The other end of input shaft 24 includes a flange 30 which may be secured to a shaft or pulley that is rotated by an engine in a vehicle (not illustrated). Viscous fluid (not illustrated) is provided within the cavity to transfer rotational forces from clutch member 28 to housing member 12. Such force transfer is well known in the art and is accomplished by viscous shear between mating surfaces of the clutch and housing members. Mounted along the rotational axis A—A of drive 10 is a valve shaft 32 which is free to rotate in cover 16. Appropriate seals are provided to prevent fluid leakage from reservoir 22. One end of valve shaft 32 is secured to a valve arm 34 while the other end of the valve shaft is secured to the inner end 36 of a bimetallic helical coil spring 38. The outer end 40 of spring 38 is connected to a clip 42 which is rigidly attached to cover 16.

Housing member 12 includes a generally cylindrical surface 44 and an annular generally radially extending surface 46 which define, in part, working chamber 20. Another boundary of working chamber 20 is defined by valve plate 18. Clutch member 28 includes a pair of axially spaced annular generally radially extending surfaces 48 and 50 which respectively are adjacent to surface 46 and valve plate 18. The outer periphery of clutch member 28 is defined by an outer peripheral surface 52 that is spaced from surface 44.

There is located on radially extending surface 50 an annular pumping surface 56. A pump element 58 is rigidly secured to valve plate 18 and is closely spaced from pumping surface 56. A discharge passage 60 is located in cover plate 18 and communicates working chamber 20 with reservoir 22. As illustrated in FIG. 2, when clutch member 28 rotates, fluid flows from working chamber 20 to reservoir 22 via passage 60. Located immediately behind pump element 58 is an inlet passage 62 which communicates reservoir 22 with working chamber 20. As best seen in FIG. 2, valve arm 34 is movable to either cover inlet passage 62 or discharge passage 60.

Surfaces 46 and 48 of housing member 12 and clutch member 28 are provided with a plurality of spaced concentric interdigitated lands and grooves 64 and 66. For purposes of this disclosure, this area will be defined as the shear area. Clutch member 28 further includes a plurality of circumferentially spaced openings 68 located intermediate the shear area and input shaft 24. Circumferentially spaced around clutch member 28 is located a plurality of fluid four flow passages 70 which are generally U shaped in configuration. In the preferred embodiment, flow passages 70 are located in clutch member 28, spaced 90° apart, while three similar flow passages 72 are located in housing member 12, spaced 120° apart. Each flow passage 70 in clutch member 28 terminates at its outermost portion in an axially extending opening 74 which projects through the clutch member radially outwardly from lands and grooves 64 and 66 and communicates with pumping surface 56.

Briefly, drive 10 operates in the following manner. A fan is secured to housing member 12 by bolts located in openings 75. Flange 30 is secured to the shaft of a vehicle engine and is rotated by the engine to rotate input shaft 24 in a counterclockwise direction as viewed in FIG. 2 and, accordingly, clutch member 28. When valve arm 34 is located in the position illustrated in FIG. 2, fluid is pumped out of working chamber 20 into reservoir 22 via passage 60. When the fluid is pumped out of the working chamber, a minimal amount of drive occurs between clutch member 28 and housing member 12. As the temperature of the vehicle is increased and such temperature increase is sensed by spring 38, valve arm 34 is rotated to the left in FIG. 2 covering discharge passage 60 and uncovering inlet passage 62. This rotation of the valve arm prevents the flow of fluid out of working chamber 20 to reservoir 22 while allowing for fluid flow from reservoir 22 into working chamber 20 through inlet passage 62. As fluid fills working chamber 20, rotation of clutch member 28 results in rotation of housing member 12 through viscous shear. As the engine cools down and such lower temperatures are sensed by spring 38, valve arm 34 is moved back to the position illustrated in FIG. 2 and fluid again is pumped out of working chamber 20 into reservoir 22 resulting in a decrease in the rotational speed of housing member 12. During discharge of fluid through discharge passage 60, the fluid flows through the shear area through the grooves 70 and 72 into passages 74 and from there to pump element 58.

Figure 4:
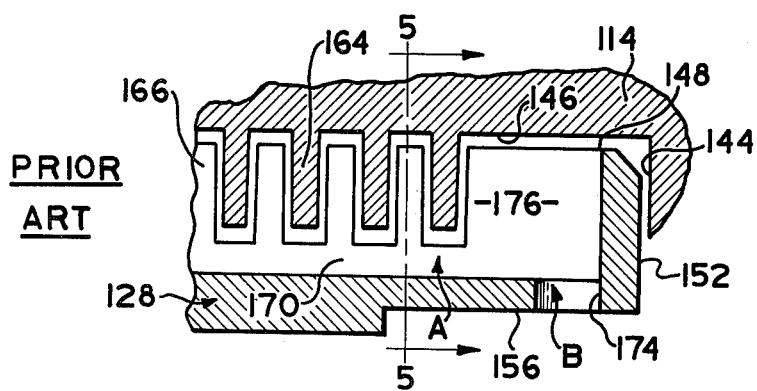
FIG. 4 is a view of a portion of the land and groove area of a prior art clutch.
Figure 5:
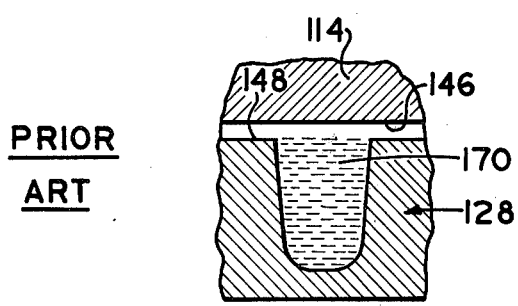
FIG. 5 is a view taken along lines 5—5 of FIG. 4.

FIGS. 4 and 5 illustrate the most common groove configuration for grooves in the clutch member that is presently used for temperature responsive viscous fan drives. Parts corresponding to FIGS. 1 to 3 are indicated by corresponding numbers preceded by one hundred in FIGS. 4 and 5. In the groove 170 illustrated in FIGS. 4 and 5, fluid is free to flow directly from left to right through the shear area without any major obstruction into an area 176 that is not interrupted by lands and grooves 164 and 166 and from there into passage 174. It has been determined that in using this type of arrangement as the speed of the input shaft is increased to the 6000 rpm range, that a greater degree of fluid pumpout exists from working chamber 20 to reservoir 22 than is desired. This results in a reduction in the speed of housing member 12 which may be detrimental to proper cooling requirements for the given application. With input speeds of less than 4000 rpm, this greater degree of fluid pumpout has not been a problem and the arrangement of FIGS. 4 and 5 have worked exceptionally well.

Figure 6:
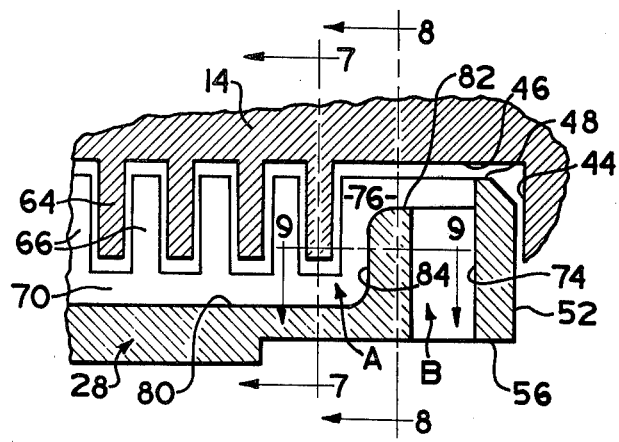
FIG. 6 is a view similar to FIG. 4 but illustrating that portion of the clutch in accordance with features of the invention.

In an effort to correct this greater fluid pumpout during the higher input speeds and as indicated in FIG. 1, the assignee of this application has provided a radial support indicated at 78 on cover plate 16 to prevent valve arm 34 from being forced away from valve plate 18. A further improvement has also been accomplished by providing a restriction in each groove 70 as illustrated in FIG. 6. In the preferred embodiment, this restriction is accomplished by a step design in the area 76 of groove 70 prior to axial opening 74.

Figure 7:
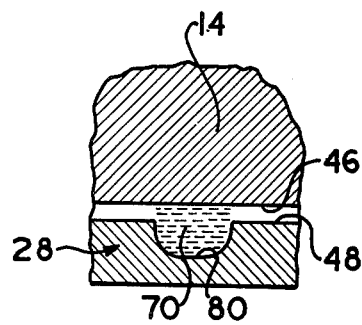
FIGS. 7 to 9 are views respectively taken along lines 7—7, 8—8, and 9—9 of FIG. 6.
Figure 8:
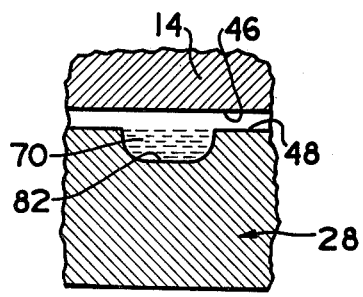
Figure 9:
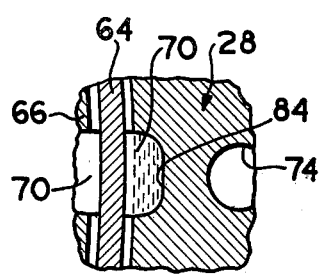
Figure 10:
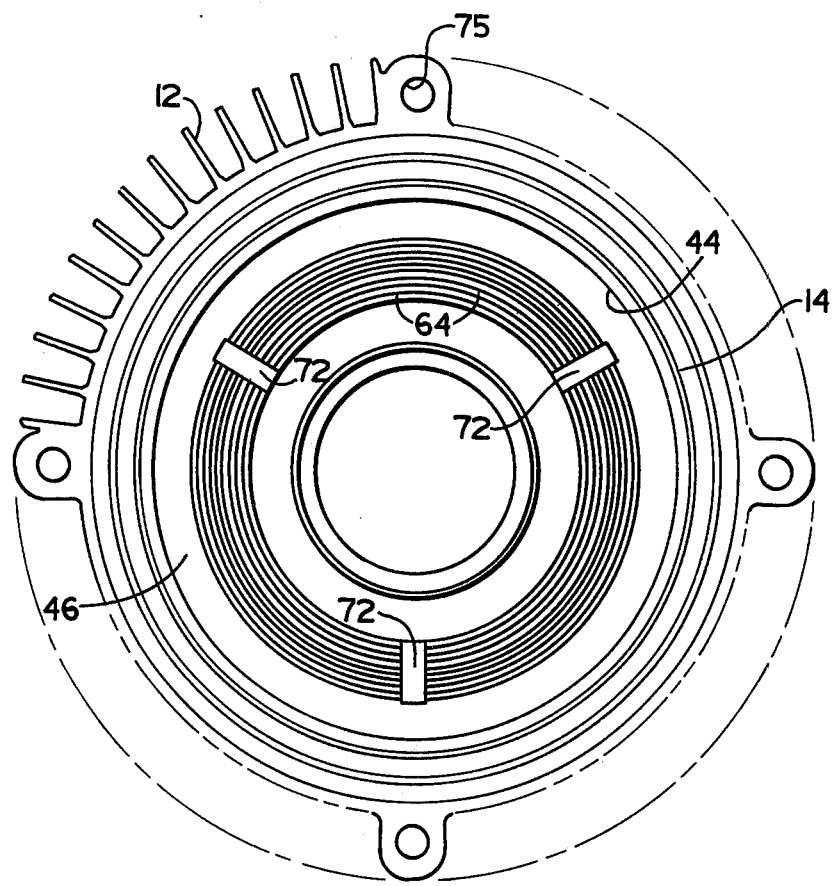
FIG. 10 is a view of the entire housing taken along line 3—3 but in the opposite direction.

Referring now in greater detail to FIGS. 5 through 9, in a typical application, the outer diameter of clutch member 28 is approximately 3.5 inches while the inner diameter of the shear area is approximately 2.3 inches and the outer diameter of the shear area is approximately 3 inches. Each of the U grooves 70 have a width of approximately one-eighth of an inch and a depth of approximately 0.155 inches in cross sectional area as indicated in FIG. 5. In FIG. 7, the approximate cross sectional area of the shaded portion is 0.0065 square inches. In FIG. 8, the approximate cross sectional area of the shaded portion is 0.0045 square inches. In FIG. 9, the cross sectional area of the shaded portion is approximately 0.0044 square inches while the diameter of hole 74 is 0.090 inches. The cross sectional area of the shaded portion in FIG. 5 is approximately 0.017 square inches. From standard fluid flow equations it can be shown that for a constant pressure drop from point A to point B, the exit of opening 74, that approximately four times as much fluid would flow from point A to point B in the arrangement set forth in FIG. 4 then would flow in the arrangement set forth in FIG. 6. It can further be shown by standard fluid flow calculation that if the flow through the grooves 70 and 72 to point A is considered to be one unit, the flow to point B with the modified configuration of FIG. 6 will be equal to or less than one unit. It is, accordingly, believed that the major significance of the step configuration is to ensure that the flow of fluid beyond point A from the shear area is equal to or less than the maximum flow that can be acquired out of opening 74. Although such an assumption cannot be proven, it has been proven that the disclosed step configuration illustrated in FIGS. 6 through 9 greatly reduces high speed pumpout in a viscous fan drive according to FIG. 1 which employs valve arm 34, support 78, and the arrangement of pump element 58, discharge passage 60 and inlet passage 62. It has further been proven that even in the absence of the covering of discharge passage 60 with valve arm 34 that high speed pumpout will be reduced with the arrangement shown in FIGS. 6 through 9 over a similar viscous fan drive employing the known arrangements of FIGS. 4 and 5. Accordingly, this application is directed toward the restriction provided in area 76 and more particularly to the step configuration generally defined by a first generally radially extending surface 80 which defines the back surface of groove 70 of FIG. 7, a second generally radially extending back surface 82 axially spaced from the first radially extending back surface and terminating at opening 74 and defining the U groove of FIG. 8, and a generally axially extending back surface 84 terminating at surfaces 80 and 82 and defining the back surface of the U groove of FIG. 9.

We claim:

1. A viscous fan drive comprising:
   (a) a housing rotatable about an axis and defining a cavity having a working chamber and a reservoir;
   (b) a clutch member rotatable about said axis and located within said working chamber;
   (c) an annular shear area within said working chamber defined by said members and located radially outwardly from said axis;
   (d) viscous shear fluid located within said cavity;
   (e) means to direct said fluid from said reservoir to said shear area;
   (f) means to pump said fluid from said shear area to said reservoir, said pumping means being located radially outwardly from said shear area;
   (g) an input shaft mounted for rotation about said axis on one of said members and secured to the other member whereby rotation of said input shaft will cause rotation of said one member when viscous fluid is located within said annular shear area;
   (h) a plurality of circumferentially spaced fluid flow paths extending radially on said clutch member through said shear area, each flow path having an effective area of A units and being in fluid communication with said directing means; and
   (i) a fluid flow restriction path on said clutch member in fluid communication with each of said flow paths radially outwardly from said shear area and in fluid communication with said pumping means to direct substantially all of said fluid from said respective flow path to said pumping means, each restriction path having an effective area of B units, the value of B units being less than the value of A units to restrict, within said restriction path, said fluid flow from said respective flow path to said pumping means.

2. A viscous fan drive comprising:
   (a) a housing member rotatable about an axis and defining a working chamber and a reservoir;
   (b) a clutch member rotatable about said axis and located within said working chamber;
   (c) an annular shear area within said working chamber defined by said members and located radially outwardly from said axis;
   (d) viscous shear fluid located within said reservoir;
   (e) means to direct said fluid from said reservoir to shear area;

(f) means to pump said fluid from said shear area to said reservoir, said pumping means being located radially outwardly from said shear area;

(g) an input shaft mounted for rotation about said axis on one of said members and secured to the other member whereby rotation of said input shaft will cause rotation of said one member when viscous fluid is located within said annular shear area;

(h) a plurality of circumferentially spaced radially extending fluid flow grooves transversing said annular shear area on said clutch member and each terminating at a fluid flow restriction path, each of said grooves having a generally constant cross sectional area of A units and being in fluid communication with said directing means; and (i) each of said fluid flow restriction paths has an effective area of B units and comprises a circumferentially spaced radially extending groove radially outwardly from said respective groove of said fluid flow path and communicating at one end with said groove of said fluid flow path and terminating at another end, and an axially extending opening projecting through said clutch member radially outwardly from said groove of said fluid flow restriction path and communicating with said means to pump fluid and with the other end of said groove of said fluid flow restriction path to direct substantially all of said fluid from said respective fluid flow path to said pumping means, the value of B units being less than the value of A units.

3. A viscous fan drive according to claim 2 wherein said shear area is defined by a plurality of spaced concentric interdigitated lands and grooves on said members.

4. A viscous fan drive according to claim 3 wherein said drive further includes a plurality of circumferentially spaced radially extending grooves located on said housing member, the number of grooves on said housing member being different from the number of grooves on said clutch member by one.

5. A viscous fan drive comprising:
(a) a housing member rotatable about an axis and having a generally cylindrical surface and an annular radially extending surface partially defining a cavity;
(b) a radially extending valve plate secured to said housing member and dividing said cavity into a working chamber containing said cylindrical surface and a reservoir;
(c) an annular clutch member rotatable about said axis and located within said working chamber and having an outer peripheral surface spaced from said generally cylindrical surface and a pair of axially spaced annular radially extending surfaces, one of said radially extending surfaces of said clutch member being adjacent said radially extending surface of said housing member and the other of said radially extending surfaces of said clutch member being adjacent said valve plate;
(d) an annular shear area within said working chamber defined radially outwardly from said axis;
(e) viscous shear fluid located within said cavity;
(f) means to direct said fluid from said reservoir to said shear area;
(g) means to pump said fluid from said shear area to said reservoir, said pumping means being located radially outwardly from said shear area;

(h) an input shaft mounted for rotation about said axis on one of said members and secured to the other member whereby rotation of said input shaft will cause rotation of said one member when said fluid is located within said annular shear area; and (i) a plurality of circumferentially spaced radially extending grooves transversing said shear area on said clutch member and terminating radially outwardly from said shear area, each of said grooves having a generally constant cross sectional area as they transverse said shear area and a reduced cross sectional area radially outwardly from said shear area, each of said grooves is generally U shaped through its length and has a first generally radially extending surface defining a back surface of the groove in the shear area, said groove throughout said shear area defining a flow path with an effective area of A units, a second generally radially extending back surface axially spaced from said first radially extending back surface and a generally axially extending back surface terminating at one end at said first radially extending surface and at the other end at said second radially extending surface, said U groove throughout the area of said axially and second radially extending back surfaces defining a flow path with an effective area that is less than A units.

6. A viscous fan drive according to claim 5 wherein said shear area is defined by a plurality of spaced concentric interdigitated lands and grooves on said members.

7. A viscous fan drive according to claim 5 wherein said radially extending surface on said housing member includes a plurality of circumferentially spaced radially extending grooves transversing said shear area on said housing member, the number of grooves on said housing member being different from the number of grooves on said clutch member by one.

8. A viscous fan drive comprising:
(a) a housing member rotatable about an axis and having a generally cylindrical surface and an annular radially extending surface partially defining a cavity;
(b) a radially extending valve plate secured to said housing member and dividing said cavity into a working chamber containing said cylindrical surface and a reservoir;
(c) an annular clutch member rotatable about said axis and located within said working chamber and having an outer peripheral surface spaced from said generally cylindrical surface and a pair of axially spaced annular radially extending surfaces, one of said radially extending surfaces of said clutch member being adjacent said radially extending surface of said housing member and the other of said radially extending surfaces of said clutch member being adjacent said valve plate;
(d) an annular shear area within said working chamber defined radially outwardly from said axis;
(e) viscous shear fluid located within said cavity;
(f) means to direct said fluid from said reservoir to said shear area;
(g) means to pump said fluid from said shear area to said reservoir, said pumping means being located radially outwardly from said shear area and including an annular pumping surface on said radially extending surface of said clutch member adjacent said valve plate, a pumping element secured to said valve plate and closely spaced from said annular pumping surface, and an opening in said valve plate adjacent to said pumping element;

(h) an input shaft mounted for rotation about said axis on one of said members and secured to the other member whereby rotation of said input shaft will cause rotation of said one member when said fluid is located within said annular shear area;

(i) a plurality of circumferentially spaced axially extending openings projecting through said clutch member radially outwardly from said shear area and communicating at one side of said clutch member with said annular pumping surface; and (j) a plurality of circumferentially spaced radially extending grooves transversing said shear area on said clutch member and terminating at said axially extending openings, each of said grooves having a generally constant cross sectional area as they transverse said shear area and a reduced cross sectional area intermediate said shear area and said axially extending openings, each of said grooves is generally U shaped through its length and has a first generally radially extending surface defining the back surface of the groove in the shear area, said groove throughout said shear area having a cross sectional area of A units, a second generally radially extending back surface axially spaced from said first radially extending back surface and terminating at one end at one of said axially extending openings, said U groove throughout the area of said second radially extending back surface having a cross sectional area that is less than A units, and a generally axially extending back surface terminating at one end at said first radially extending surface and at the other end at said second radially extending surface, said U groove throughout the area of the axially extending back surface having a cross sectional area that is less than A units.

9. A viscous fan drive according to claim 8 wherein said shear area is defined by a plurality of spaced concentric interdigitated lands and grooves located on said radially extending surfaces of said members.

10. A viscous fan drive according to claim 8 wherein said radially extending surface of said housing member includes a plurality of circumferentially spaced radially extending grooves transversing said lands and grooves area on said housing member, the number of grooves on said housing member being different from the number of grooves on said clutch member by one.

11. A viscous fan drive according to claim 8 wherein said shear area is defined by a plurality of spaced concentric interdigitated lands and grooves on said members.

* * * * *

UNITED STATES PATENT AND TRADEMARK OFFICE
CERTIFICATE OF CORRECTION

PATENT NO. : 4,116,318

DATED : September 26, 1978

INVENTOR(S) : Richard T. Crisenbery; Thomas H. Tinholt

It is certified that error appears in the above—identified patent and that said Letters Patent are hereby corrected as shown below:

Col. 2, line 34: after "fluid" delete "four".

line 36: before "flow" insert "four".

Col. 3, line 57: "then" should read "than".

*Signed and Sealed this*

*Twenty-third* Day of *January 1979*

[SEAL]

Attest:

RUTH C. MASON
*Attesting Officer*

DONALD W. BANNER
*Commissioner of Patents and Trademarks*